Patented Aug. 10, 1926.

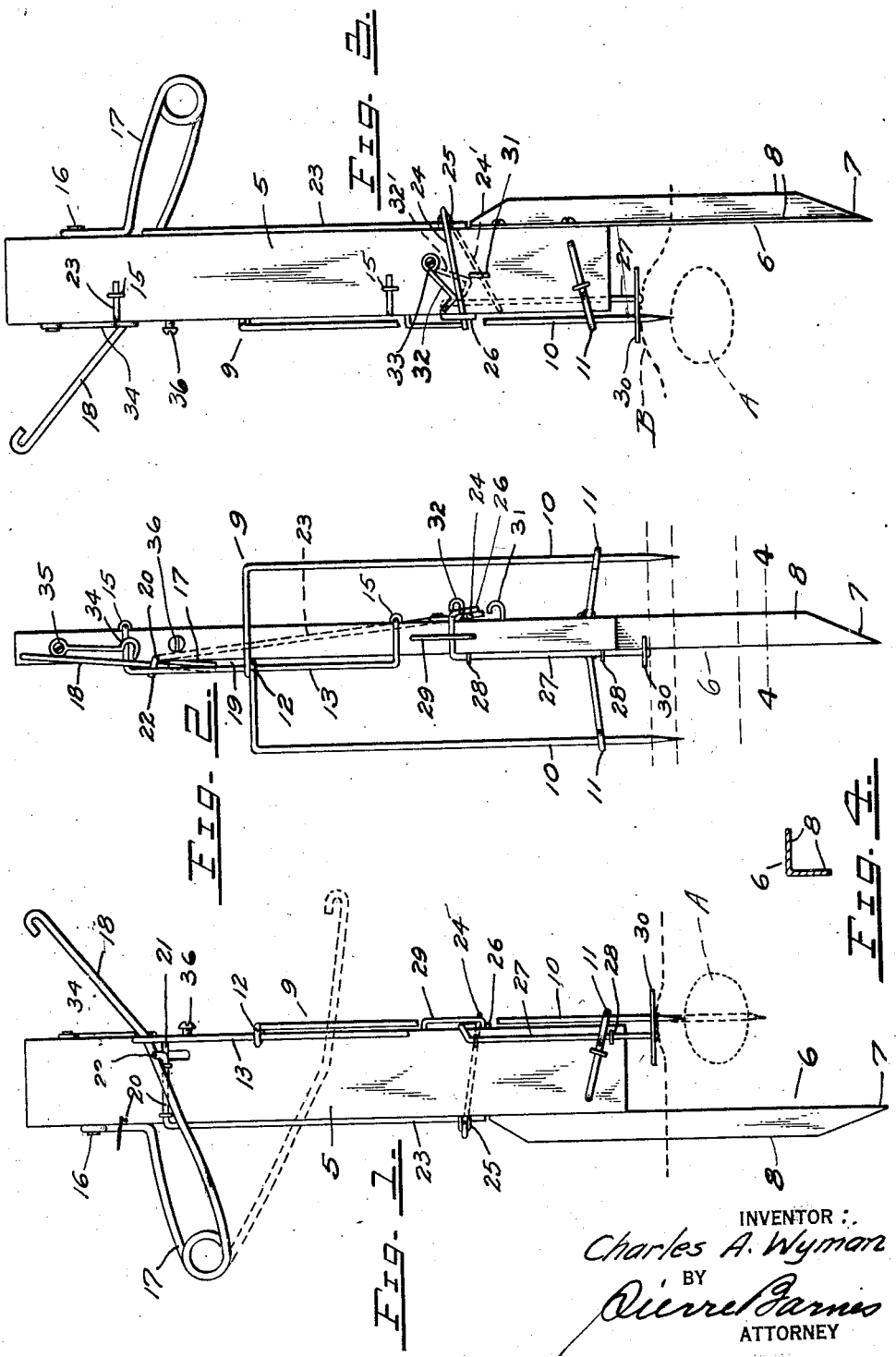

1,595,331

UNITED STATES PATENT OFFICE.

CHARLES A. WYMAN, OF AUBURN, WASHINGTON.

ANIMAL TRAP.

Application filed October 27, 1924. Serial No. 745,961.

This invention relates to animal traps intended, more especially, for use in catching moles.

The object of my invention generally is the perfecting of traps of this character to enable the same to be more readily set, it is convenient to handle with safety to the operator, and peculiarly efficient in use.

Other objects and advantages of the invention will appear in the following specification.

The invention consists in the novel construction, adaptation and combination of parts hereinafter described and claimed.

In the accompanying drawing,—

Figure 1 is an elevation of the left hand side; Fig. 2 is a front elevation; and Fig. 3 is an elevation of the right hand side of a mole trap embodying my improvements, the trap being illustrated in its set condition. Fig. 4 is a detail sectional view on line 4—4 of Fig. 2.

The trap frame comprises a standard 5, preferably of wood and of a rectangular shape, having depending from one side thereof an anchor bar 6 adapted to engage in the ground for retaining the frame upright. Said anchor bar has its lower end desirably sharpened as at 7 to enable the anchor bar being readily pushed into the ground. The bar 6 is provided with rectangularly disposed flanges 8 which afford bearing surfaces tending to prevent the standard tilting from a vertical position.

9 represents a plunger of substantially the shape of an inverted U, having pointed side elements 10 extending through eyes of guide arms 11 which are secured to the standard 5. Said plunger is also slidably connected with a guide rod 13 by means of a coiled loop 12 provided on the plunger engaging a vertically disposed guide rod 13 which is secured as by means of staples 15 to the standard.

Secured by means of a screw 16 preferably to the upper portion of the standard is a sear spring 17 having its striking arm 18 guided in a way 19 (Fig. 2) between the guide rod 13 and the standard so as to cause the spring to strike the plunger at or about its connection with said guide rod.

The spring arm 18 is releasably held in operative position by means of a bell-crank lever (22—20—23) having a fulcrum portion 20 seated in a transversely arranged groove 21 of the standard 5, said lever having, adjacent to one side of the standard, a short arm 22 to support the spring element 18 and a relatively long arm 23 extending downward at the other side of the standard.

The lever arm 23 is engaged by a trip arm 24 fulcrumed to a staple 25 of the standard and thence extends into engageable relation with a downwardly extending finger element 26 of a trigger 27. This trigger is guided for vertical movement as by means of attachments 28 and 29 of the standard.

At its lower end the trigger terminates in a substantially horizontal plate 30, or an equivalent, for the purpose to be presently explained.

31 represents a hook protruding from the standard for receiving the trip arm 24 when it is desirable that the latter be held in safety position after setting the spring and while securing the trap in the ground. Supplemental to said hook I provide an adjustable stop in the nature of an arm 32 pivotally connected to the standard and held thereagainst by means of a screw 33 which is regulated to frictionally retain the stop in the position in which it is indicated by dotted lines 32 in Fig. 3 to prevent the trip arm being accidentally displaced from the hook. This stop is also designed for use as a means to arrest the upward travel of the trip arm to a predetermined elevation so as to govern the distance the trigger must be raised to withdraw the finger 26 thereof from its engaged relation with the trip arm 24.

A second safety device in the nature of a hook 34 pivoted by means of a screw 35 to the standard is advantageously employed to engage the spring arm 18 until the final setting is accomplished.

36 represents a screw secured to the standard to limit the upward travel of the plunger against the accidental withdrawal of the side or prong elements 10 from the guides 11.

To set the trap the operator grasps the standard 5 in one hand and with his other hand raises the striking arm 18 of the spring above the arm 22 of the bell-crank lever and in such position of the striking arm the latter may be temporarily held by means of the hook 34.

The lever 22—23 is then regulated to have the arm 22 protruded beneath the striking arm of the spring and the other lever arm 23 is brought into engaged relation with the trip arm 24 by which it is held temporarily by engaging the trip arm (as indicated by dotted lines 24¹ Fig. 3) in the hook 31 and utilizing the stop in its 32¹ position, to retain temporarily the trip arm within the hook.

With the parts thus arranged the trap is secured in an upright position by pushing the standard anchor bar 6 downwardly into the ground at one side of the mole runway A, so that the trigger plate 30 will be directly over the runway and the plunger prongs 10 in a plane substantially of the axis of the runway. In placing the trap, the runway must be accurately located, the ground above the runway is removed and the latter filled with soft earth and well pressed down so that a mole, in order to pass therethrough, will lift the earth as indicated by B in Fig. 3. With the runway thus treated and the trap secured in place, as explained above, the operator removes the trip arm 24 from the hook 31 into engaged relation with the trigger finger 26 and also disengages the hook 34 from the spring.

When a mole lifts up the earth, as at B, the trigger will be correspondingly elevated to raise the trigger finger from the arm 24. When the arm 24 is thus released, the power of the spring 17 affects the lever 22—23 to displace the arm 22 from its path, whereupon the spring acts to deliver a blow with its striking arm 18 against the plunger to drive the latter downward with such power as to impale the mole.

Among the advantages of the invention are: conveniently adjustable devices which may be set so that the trigger may be brought to rest upon the ground independently of the trap frame or mechanism thereof; in the provision whereby the trap arm 24 may be released at selective distances which the trigger is raised; and in the devices to prevent the trap acting prematurely.

While I have illustrated the invention in an embodiment now preferred by me, I do not wish to be understood as confining myself thereto except as limited by the scope of the claims.

What I claim, is,—

1. A mole trap comprising a vertical standard, an anchor bar rigid therewith, a plunger of substantially the shape of an inverted U, guides provided upon said standard for the plunger, a spring above the plunger, a trigger connected to the standard for relative vertical movement, said trigger being provided with a downwardly directed finger, a lever engageable with the spring, and a trip arm engageable with the trigger finger and also with said lever to release the latter when the trigger is pushed upward.

2. A mole trap comprising a vertical standard, an anchor bar rigid therewith, a plunger of substantially the shape of an inverted U, guides provided upon said standard for the plunger, a sear spring having an arm secured to the standard and a striking arm located above the plunger, a trigger connected to the standard for relative vertical movement, said trigger being provided with a downwardly directed finger, a lever having an arm adapted to serve as a support for the striking arm of the spring, and a trip arm engageable with the trigger finger and also with said lever to release the latter when the trigger is pushed upward.

3. A mole trap comprising a vertical standard, an anchor bar rigid therewith, said anchor bar having two flange elements disposed in rectangular relation with each other, a plunger of substantially the shape of an inverted U, guides provided upon said standard for the plunger, a sear spring having an arm secured to the standard and a striking arm located above the plunger and guided by the standard in co-operation with one of the aforesaid guides, a trigger connected to the standard for relative vertical movement, said trigger being provided with a downwardly directed finger, a lever having an arm adapted to serve as a support for the striking arm of the spring, and a trip arm engageable with the trigger finger and also with said lever to release the latter when the trigger is pushed upward.

4. The combination with a trap frame having a vertical standard and an anchor bar, a plunger mounted for relative vertical movements to said standard, a spring for imparting downward movement to said plunger, and a vertically movable trigger, of connections between the trigger and the spring for releasably retaining the latter in spaced apart relation with respect to the plunger, said connections including a lever engageable with said spring, a trip arm releasably engaging said lever and detachably connected with the trigger, and means serving in cooperation with the trigger to effect the release of the trip arm with respect to the trigger at a selected elevation of the latter.

5. The combination with a trap frame having a vertical standard and an anchor bar, a plunger mounted for relative vertical movements to said standard, a spring adapted for striking the plunger to impart downward movement to the latter, and a vertically movable trigger, of connections between the trigger and the spring for releasably retaining the latter in inoperative condition with respect to the plunger, said connections including a trip arm detachably connected with the trigger and a lever engaging the spring and regulated by the trigger through the medium of the trip arm, and means for temporarily securing said trip arm in safety position.

6. The combination with a trap frame having a vertical standard and an anchor bar, a plunger mounted for relative vertical movements to said standard, a spring for imparting downward movement to said plunger, and a vertically movable trigger, of a lever engaging the spring for releasably retaining the latter in inoperative condition with respect to the plunger, a trip arm releasably connected to said lever and detachably connected with the trigger, and adjustable means engageable with said trip arm for temporarily securing said trip arm in safety position, said means also serving in cooperation with the trigger to effect the release of the trip arm with respect to the trigger at a selected elevation of the latter.

Signed at Auburn, Washington, this 30th day of September 1924.

CHARLES A. WYMAN.